(12) United States Patent
Lenton (10) Patent No.: US 8,424,630 B2
(45) Date of Patent: Apr. 23, 2013

(54) CONTROL APPARATUS AND METHOD FOR A HYDROSTATICALLY ACTUATED VEHICLE

(75) Inventor: Ryan Patrick Lenton, Buffalo, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 263 days.

(21) Appl. No.: 12/972,103

(22) Filed: Dec. 17, 2010

(65) Prior Publication Data

US 2012/0151905 A1 Jun. 21, 2012

(51) Int. Cl.
*B60K 17/356* (2006.01)
*B60W 10/06* (2006.01)

(52) U.S. Cl.
USPC ......... 180/307; 180/306; 701/50; 123/339.18

(58) Field of Classification Search .................. 180/305, 180/306, 307; 701/50, 99; 123/339.16, 339.18
See application file for complete search history.

(56) References Cited

U.S. PATENT DOCUMENTS

| | | | | |
|---|---|---|---|---|
| 4,185,521 A | * | 1/1980 | Beals | 477/69 |
| 4,888,949 A | * | 12/1989 | Rogers | 60/434 |
| 5,335,750 A | * | 8/1994 | Geringer et al. | 180/307 |
| 5,586,536 A | * | 12/1996 | Seo et al. | 123/352 |
| 6,553,302 B2 | | 4/2003 | Goodnight et al. | |
| 6,742,498 B2 | * | 6/2004 | Mabuchi et al. | 123/339.16 |
| D602,506 S | | 10/2009 | Marsolek et al. | |
| 7,798,270 B2 | * | 9/2010 | Lemke et al. | 180/69.3 |
| 2004/0128047 A1 | * | 7/2004 | Graves et al. | 701/54 |
| 2005/0149245 A1 | * | 7/2005 | Kilworth et al. | 701/54 |
| 2008/0286044 A1 | | 11/2008 | Laux | |
| 2009/0132131 A1 | | 5/2009 | Takeda et al. | |
| 2009/0143952 A1 | | 6/2009 | Chisholm et al. | |
| 2009/0240404 A1 | | 9/2009 | Matsuyawa | |
| 2009/0314571 A1 | | 12/2009 | Fausch | |
| 2010/0086354 A1 | | 4/2010 | Marsolek et al. | |
| 2010/0111605 A1 | | 5/2010 | Sturos et al. | |

FOREIGN PATENT DOCUMENTS

| | | |
|---|---|---|
| EP | 1172248 | 1/2002 |
| EP | 1595734 | 11/2005 |
| EP | 2123533 | 11/2009 |

* cited by examiner

*Primary Examiner* — Frank Vanaman
(74) *Attorney, Agent, or Firm* — Miller, Matthias & Hull

(57) ABSTRACT

A method and apparatus for controlling operation of an engine in a hydrostatically driven vehicle having high and economy modes may include monitoring one or more control inputs. When in the economy mode the engine may be operated: at a fixed propel neutral speed when a propel control input is in a neutral position; at a fixed propel drive speed when the propel control input is in a drive position and a propel pump displacement signal is less than a maximum displacement position of a propel pump; and at a variable drive speed when the propel control input is in the drive position and the propel pump displacement signal indicates a maximum displacement position. The economy mode conserves fuel while ensuring that sufficient engine power is maintained to operate the propel and any implement pumps provided on the vehicle.

28 Claims, 6 Drawing Sheets

CONTROL APPARATUS AND METHOD FOR A HYDROSTATICALLY ACTUATED VEHICLE

TECHNICAL FIELD

This disclosure relates generally to hydrostatically driven vehicles and, more particularly, to apparatus and methods for controlling power generation by engines associated with such vehicles.

BACKGROUND

A typical hydrostatically driven vehicle includes an engine having an output shaft connected to one or more fluid pumps. A variable displacement fluid pump is connected to the engine through a transmission and varies its displacement to accommodate power demands of various vehicle systems. The fluid pump or pumps associated with the vehicle is connected via fluid pressure lines to various actuators and hydraulic motors located on the vehicle. For example, a vehicle may have one or more hydraulic propel motors that rotate the drive wheels or rollers and move the vehicle along a base surface. Additionally, the vehicle may have one or more implements performing various functions. In the case of an asphalt or soil compactor, the implement may be a vibratory system operably coupled to the compacting drum of the vehicle. The vibratory system may operate to impart compacting energy to the base surface, thus increasing the efficiency of compaction. The vibratory system may include a hydraulic motor powered by pressurized flow of fluid from an implement pump. The speed, torque output, and power consumption of these motors are proportional to the flow rate and pressure of the hydraulic fluid passing through them.

An engine on a hydrostatically driven vehicle often typically operates in a continuous fashion at a constant speed and fueling command or, stated differently, at a constant power output. Even though the power output of the engine is constant, the power used or consumed by the various hydraulic systems of the vehicle may change based on operator commands or environmental conditions. For example, a vehicle will consume more power when travelling at a faster speed, or may impart more energy to the surface being compacted when the surface is wet.

The flow rate of hydraulic fluid supplied to the various system motors of the vehicle may be modulated to control the power supplied to those systems. Modulation may be accomplished, for example, through control of displacement pumps used in the systems or by selectively routing fluid to the various motors and actuators of the vehicle. In general, however, most vehicles operating under most conditions do not entirely consume the power generated by their engines. As is often the case, an appreciable percentage of the power generated by the engine is unused or wasted. This mode of operation causes reduced fuel economy during operation.

U.S. Patent Application Publication No. 2009/0143952 to Chisholm et al. proposes to address fuel economy concerns by estimating the current power consumption of the vehicle, comparing it to the current power output of the engine, and adjusting the engine operating parameters to more closely match the estimated power consumption. Sensors are used to detect the fluid pressure at various points in the hydraulic circuit, which data are then used to estimate the current power consumption of the vehicle.

SUMMARY OF THE DISCLOSURE

According to certain aspects of this disclosure, a method for controlling operation of an engine in a hydrostatically driven vehicle may include monitoring an engine mode control input having at least a high mode setting and an economy mode setting, monitoring a propel control input associated with a propel pump operably coupled to the engine, the propel control input having a neutral position and a drive position, and monitoring a propel pump sensor disposed to measure a displacement of the propel pump and generate a propel pump displacement signal, the displacement of the propel pump having a maximum displacement position. The engine may be operated in an economy mode when the engine mode control input is in the economy mode setting, the economy mode including operating the engine at a fixed propel neutral speed when the propel control input is in the neutral position, operating the engine at a fixed propel drive speed when the propel control input is in the drive position and the propel pump displacement signal is less than the maximum displacement position, the fixed propel drive speed being greater than the fixed propel neutral speed, and operating the engine at a variable drive speed when the propel control input is in the drive position and the propel pump displacement signal indicates the maximum displacement position.

According to other aspects of this disclosure that may be combined with the foregoing aspects, a hydrostatically driven vehicle may include an engine, an engine mode control input having at least an economy mode setting, a propel pump operably coupled to the engine, the propel pump having a variable displacement output having a maximum displacement position, a propel pump sensor disposed to measure the variable displacement output and generate a propel pump displacement signal, a propel pump actuator operably coupled to the propel pump and configured to adjust the variable displacement output of the propel pump, and a propel control input operably coupled to the propel pump, the propel control input having a neutral position and drive position. A controller may be operatively coupled to the engine, the engine mode control input, the propel pump sensor, the propel pump actuator, and the propel control input, the controller being configured to operate in an economy mode in response to the engine mode control input being placed in the economy mode setting, in which the controller operates the engine at a fixed propel neutral speed when the propel control input is in the neutral position, operates the engine at a fixed propel drive speed when the propel control input is in the drive position and the propel pump displacement signal is less than the maximum displacement position, the fixed propel drive speed being greater than the fixed propel neutral speed, and operates the engine at a variable drive speed when the propel control input is in the drive position and the propel pump displacement signal indicates the maximum displacement position According to additional aspects of this disclosure that may be combined with any of these aspects, an implement control input associated with an implement pump operably coupled to the engine may be monitored, wherein the implement pump is operably coupled to an implement. The implement control input may have a disengaged position and an engaged position. The economy mode may further include operating the engine at a fixed implement drive speed when the implement control input is in the engaged position, wherein the fixed implement drive speed being greater than the fixed propel drive speed.

According to further aspects of this disclosure that may be combined with any of these aspects, the implement may comprise a vibratory system.

According to further aspects of this disclosure that may be combined with any of these aspects, a parking brake control input having an engaged position and a disengaged position may be monitored, and the economy mode may further include operating the engine at a fixed parking brake speed when the parking brake control input is in the engaged position, wherein the fixed parking brake speed being less than the fixed propel neutral speed.

According to additional aspects of this disclosure that may be combined with any of these aspects, a steering control input associated with a steering drive may have an engaged position and a disengaged position. The steering control input may be monitored and the economy mode may further include operating the engine at a fixed steering initiated speed when the propel control input is in the neutral position and the steering control input is in the engaged position, the fixed steering initiated speed being greater than the fixed propel neutral speed and less than the fixed propel drive speed.

According to further aspects of this disclosure that may be combined with any of these aspects, the economy mode may further comprise initiating a speed reduction timer and setting a peak command speed in response to a falling propel drive signal, and reducing engine speed at a reduction rate when a current propel drive signal remains below the peak command speed and the speed reduction timer exceeds a reduced speed timer limit.

According to further aspects of this disclosure that may be combined with any of these aspects, the reduction rate may be approximately 5 rpm/second and the reduced speed timer limit may be approximately 30 seconds.

According to additional aspects of this disclosure that may be combined with any of these aspects, the economy mode may further include initiating a propel neutral timer in response to the propel control input moving from the drive position to the neutral position, and reducing engine speed to a low idle speed when the propel control input remains in the neutral position and the propel neutral timer exceeds a propel neutral limit.

According to further aspects of this disclosure that may be combined with any of these aspects, the low idle speed may be approximately 1000 rpm and the propel neutral limit may be approximately 10 seconds.

According to additional aspects of this disclosure that may be combined with any of these aspects, a parking brake control input having an engaged position and a disengaged position may be monitored. The engine may be operated in a high mode when the engine mode control input is in the high mode setting, the high mode including initiating a high mode propel neutral timer when the parking brake control input is in the disengaged position and the propel control input is in the neutral position, and automatically switching the engine from the high mode setting to the economy mode setting when the propel control input remains in the neutral position and the high mode propel neutral timer exceeds a high mode propel neutral limit.

According to further aspects of this disclosure that may be combined with any of these aspects, the high mode propel neutral limit may be approximately 5 minutes.

According to additional aspects of this disclosure that may be combined with any of these aspects, the high mode may further include automatically switching the engine from the high mode setting to the economy mode setting when the parking brake control input is in the engaged position

DETAILED DESCRIPTION

This disclosure relates to methods and apparatus for controlling operation of hydrostatically driven vehicles to reduce fuel consumption during operation. During startup, the vehicle may be placed in an economy mode in which the positions of various user control inputs are monitored and the engine is operated at one of multiple predetermined fixed engine speeds. The user control inputs may include a parking brake control input, a propel control input, an implement control input, a steering control input, and an engine mode control input. The predetermined fixed engine speeds are selected to accommodate power demands associated with the various permutations of the user control input settings while being lower than the engine speeds used in conventional hydrostatically driven vehicles. Additionally, the economy mode may control the engine to operate at variable speeds when the propel command speed exceeds the capacity of the propel pump at maximum displacement at the current engine speed. During variable engine speed operation, when the command speed is decreasing, a corresponding reduction in engine speed may be delayed to reduce engine speed hunting during common operations, such as high cycle reversal applications. Still further, the economy mode may automatically switch the engine to a low idle in response to certain scenarios, such as when the propel control input is returned to a neutral position for a period of time. The engine may also be switched from a high speed mode to economy mode in response to certain user input conditions, such as when the parking brake input is engaged or the propel control input remains in the neutral position for a period of time. The foregoing methods and apparatus operate the engine in a more efficient state while providing adequate power to meet vehicle demands.

Figure 1:
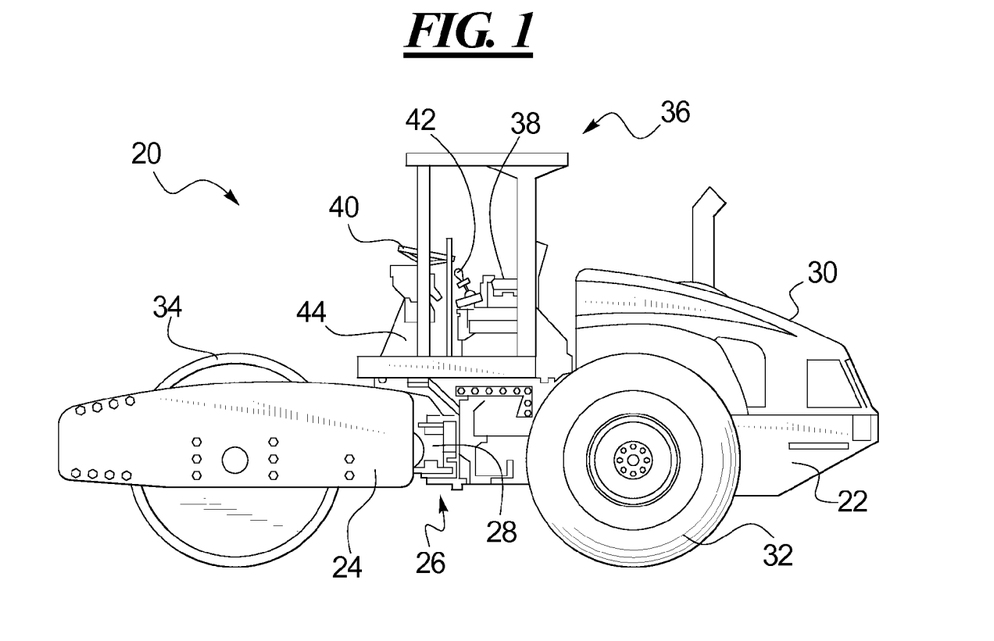
FIG. 1 is a side elevation view of one example of a hydrostatically driven vehicle according to the present disclosure.

One example of a hydrostatically driven vehicle 20 is shown in FIG. 1. The vehicle 20 is a soil compactor vehicle that is used for illustration purposes only. Alternatively, the vehicle may be an asphalt compactor or any other type of hydrostatically operated vehicle using hydraulic systems for propulsion and implement operation. Examples of other types of vehicles using hydraulic systems include vehicles used for a variety of tasks, including, for example, loading, compacting, lifting, brushing, and so forth. As can be appreciated, vehicles using hydraulic powered propulsion arrangements may be used, for example, in the construction, mining, agricultural industries, and so forth.

In the exemplary embodiment, the vehicle 20 includes an engine frame portion 22 and a non-engine frame portion 24. The engine frame portion 22 and the non-engine frame portion 24 are connected by an articulated joint 26 that includes a hinge 28, which allows the vehicle 20 to steer during operation. The engine frame portion 22 includes an engine 30 and a set of wheels 32 (only one wheel is visible). The engine 30 can be an internal combustion engine, for example, a compression ignition engine, but in general, the engine 30 can be any prime mover that provides power to various systems of the vehicle.

The non-engine frame portion 24 accommodates a drum 34 rotating about a centerline thereof while the vehicle 20 is in motion. The drum 34, which may include an internal vibratory system, acts to compact the terrain beneath the vehicle 20. The vehicle 20 is typically operated by an operator occupying a cab 36. The cab 36 may include a seat 38, a steering mechanism 40, a speed-throttle or control lever 42, a console 44 and/or other user control inputs. An operator occupying the cab 36 can control the various functions and motion of the vehicle 20 by, for example, using the steering mechanism 40 to set a direction of travel for the vehicle 20 or using the control lever 42 to set the travel speed of the vehicle. As can be appreciated, the representations of the various control mechanisms presented herein are generic and are intended to encompass all possible mechanisms or devices used to convey an operator's commands to a vehicle.

Figure 2:
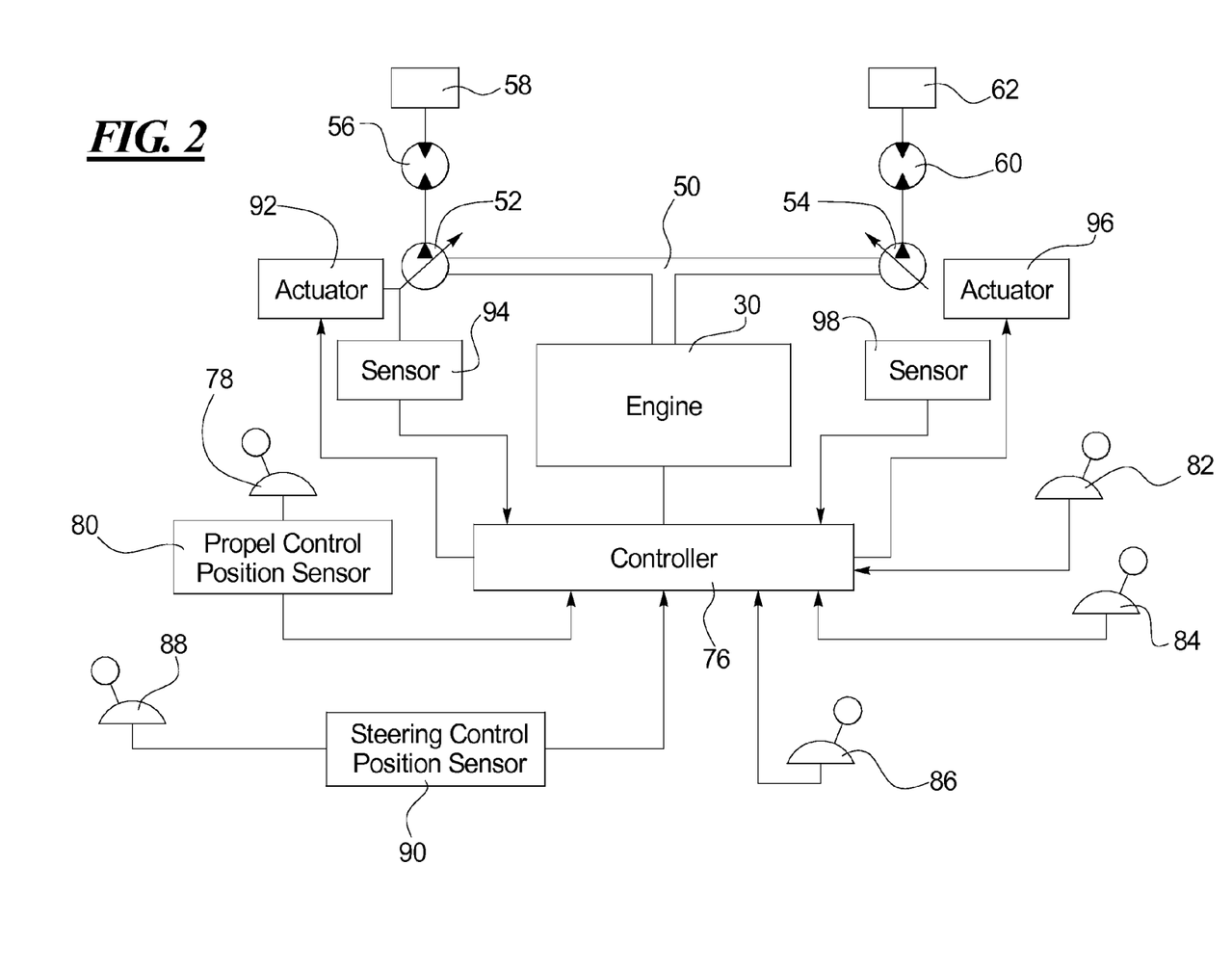
FIG. 2 is a block diagram of various components and systems of the vehicle shown in FIG. 1.

FIG. 2 is a block diagram of various components and systems of the vehicle 20. The engine 30 may be connected via a mechanical link, such as a transmission 50, to a propel pump 52 and an implement pump 54. The propel and implement pumps 52, 54 may be variable displacement pumps as schematically shown in FIG. 2. While a single propel pump and a single implement pump are shown, it will be appreciated that additional propel and implement pumps may be provided, either in tandem with other pumps or in any other appropriate arrangement.

The propel pump 52 may be connected to a propel motor 56. The propel motor 56 may be a hydrostatic drive motor operatively coupled to a traction device 58, which may be the wheels 32, drum 34, or other driven fraction devices. Similarly, the implement pump 54 may be connected to an implement motor 60, which may also be a hydrostatic drive motor. The implement motor 60 may be operatively coupled to an implement. In the exemplary compaction vehicle 20, the implement may be a vibratory system 62.

Figure 3:
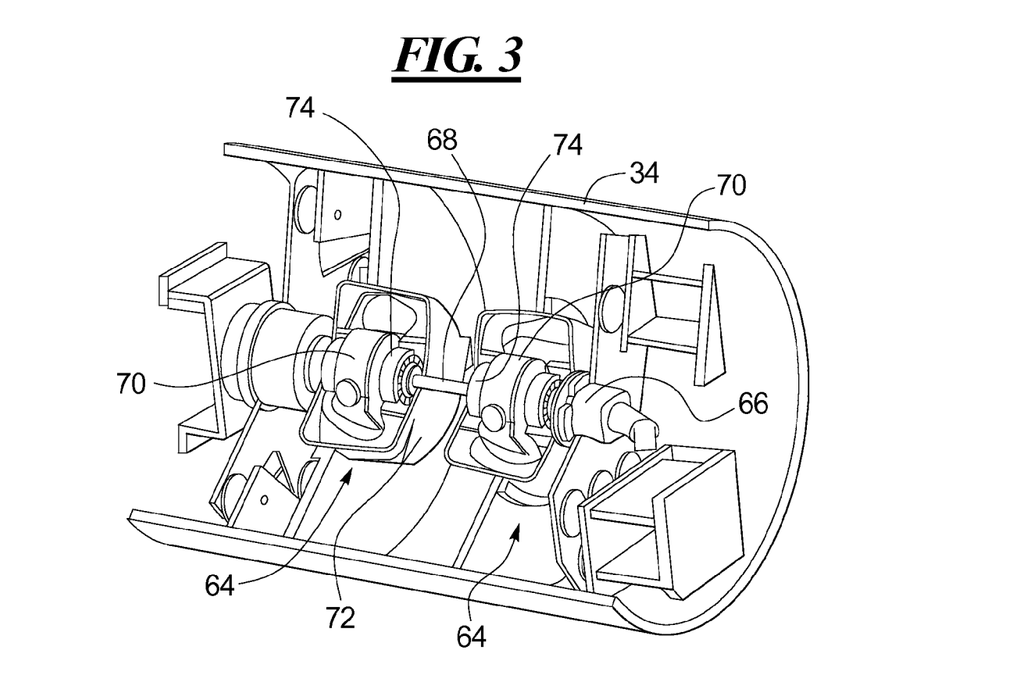
FIG. 3 is a breakaway view of a compactor drum including a vibratory system as one example of an implement in accordance with the disclosure.

A partial breakaway view of the drum 34 showing an exemplary vibratory system 62 is illustrated in FIG. 3. The illustrated vibratory system 62 includes two vibrator arrangements 64. A vibrator motor 66 has an output shaft 68 extending centrally along the drum 34. Each vibrator arrangement 64 includes an eccentric weight 70 enclosed in a respective two-piece housing 72 connected to the drum 34. During operation, the vibrator motor 66 rotates the output shaft 68, which in turn rotates the eccentric weights 70 that are rigidly connected thereto to cause a vibration of the drum 34. A set of bearings 74 connected on either side of each vibrator arrangement 64 transfers the vibration caused by each rotating eccentric weight 70 to the drum 34.

An electronic controller 76 is connected to the vehicle 20 and arranged to receive information from various sensors and other input controls on the vehicle 20, process that information, and issue commands to various actuators within the system during operation. Connections pertinent to the present description are shown but, as can be appreciated, a great number of other connections may be present relative to the controller 76.

In this embodiment, the controller 76 is connected to a propel control input 78 which may be used to set a desired propel speed setting for the vehicle 20. The propel control input 78 may be provided as a lever, joystick, or other user-engageable structure having a neutral position, which may be a default position. The propel control input 78 may be manipulated to one or more drive positions. The drive positions may be in different directions relative to the neutral position, such as opposite forward and reverse directions. The position of the propel control input 78 may be translated to a control signal by a propel control sensor 80 associated with the propel control input 78. For example, the propel control sensor 80 may encode the displacement of the propel control input 78 and relay information indicative of the displacement of the propel control input 78 to the controller 76.

The controller 76 is also connected to an implement control input 82 which may be used to initiate or stop operation of the implement. The implement control input 82 may be provided as a simple on/off button or switch. Alternatively, the implement control input 82 may be provided as a multiple position switch or other device permitting additional implement operating modes. The state of the implement control input 82 may be translated to a control signal, either directly or via a sensor, that is relayed to the controller 76.

In the exemplary embodiment, the controller 76 is further connected to a parking brake control input 84 which may be used to engage or disengage a parking brake provided on the vehicle. The parking brake control input 84 may be provided as a simple on/off button, switch, or other arrangement permitting a user to input a desired parking brake command. The state of the parking brake control input 84 may be translated to a control signal, either directly or via a sensor, that is relayed to the controller 76.

The controller 76 of the exemplary vehicle 20 is also connected to an engine mode control input 86 which may be used to select a desired engine mode for the vehicle 20. Hydrostatically driven vehicles typically have at least a low mode, during which the engine is driven at a fixed low engine speed, and a high mode, during which the engine is driven at a fixed high engine speed. The engine may further have one or more intermediate modes associated with fixed intermediate engine speeds. In the exemplary embodiment, the engine 30 has an economy mode, which is described in greater detail below. The engine mode control input 86 permits a user to select the desired engine mode for the vehicle operation to be executed. Accordingly, the engine mode control input 86 may be a button, switch, or other input device that permits a user to input two or more engine mode commands. The state of the engine mode control input 86 may be translated to a control signal, either directly or via a sensor, that is relayed to the controller 76.

Still further, in vehicles having hydraulic steering systems (such as asphalt compactors), the controller 76 may be connected to a steering control input 88 which may be used to initiate and/or control the steering system. The steering control input 88 may be as simple as a button or two-position switch used to initiate or stop the steering system. Additionally or alternatively, the steering control input 88 may be configured to permit a user to input directional information regarding the intended travel direction of the vehicle, such as by providing a wheel or joystick. The position of the steering control input 88 may be translated to a control signal, either directly or via a steering sensor 90 (depending on the features of steering control input 88).

As noted above, the propel pump 52 may be provided as a variable displacement pump. Accordingly, the propel pump 52 may have an adjustable member to alter pump displacement. For example, the adjustable member may be a swashplate (not shown) that may be moved to different angles to adjust pump displacement. A propel pump actuator 92 may be provided to move the swashplate to the desired angle. A propel pump sensor 94 may sense or measure the displacement angle of the swashplate and generate a propel pump displacement signal. The propel pump actuator 92 and propel pump sensor 94 are connected to the controller 76 so that the displacement of the propel pump 52 may be controlled according to the propel control input 78, thereby to adjust the ground speed of the vehicle.

Similarly, the implement pump 54 may also be provided as a variable displacement pump having an adjustable member, such as a swashplate, to vary pump displacement. An implement pump actuator 96 may be provided to move the swashplate to the desired angle. An implement pump sensor 98 may sense or measure the displacement angle of the swashplate. The implement pump actuator 96 and implement pump sensor 98 are connected to the controller 76 so that the displacement of the implement pump 54 may be controlled according to the implement control input 82, thereby to adjust operation of the implement.

The controller 76 is operably connected to the engine 30 to adjust the speed of the engine according to the control inputs received by the controller 76. During operation, the engine 30 operates to provide power to each of the propel pump 52 and implement pump 54 via the transmission 50. The power input to each pump 52, 54 is used by the propel and implement motors 56, 60. Consequently, the total power consumption of the system depends on the aggregate power consumed by each of the motors 56, 60. Given that the power consumption of each motor 56, 60 is selectable by the operator based on the needs of the vehicle during operation, and also given that the engine 30 typically operates in a continuous fashion outputting a constant power output, it is often the case that an appreciable percentage of the power produced by the engine 30 is wasted. To avoid the waste of power generated by the engine 30, the controller 76 is arranged to operate in an economy mode that modulates the power output of the engine 30 such that power demands of the vehicle are met while a reduced amount of power is wasted. More specifically, the controller 76 provides fixed or variable engine command speeds based on the engagement or disengagement of the various vehicle systems.

Figure 4:
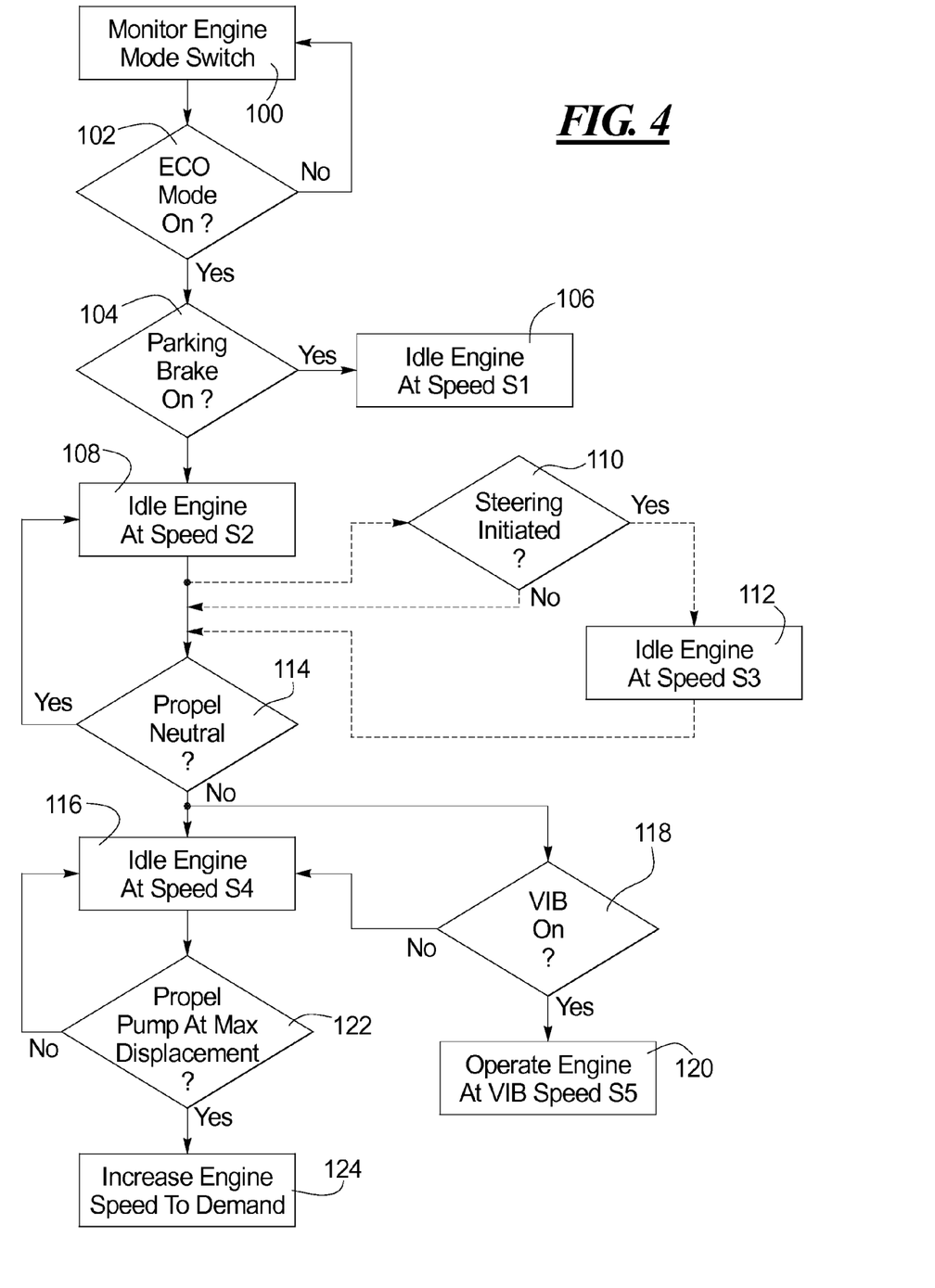
FIG. 4 is a flowchart for a method of operating the engine in an economy mode during startup of a hydrostatically operated vehicle in accordance with the present disclosure.

A flowchart for a method for operating an engine of a hydrostatically driven vehicle in an economy mode during startup is shown in FIG. 4. The vehicle may include an implement such as a vibratory system. The vehicle may also include one or more propel motors operating to rotate a wheel or drum of the vehicle and propel the vehicle along a base surface. The method starts at box 100 by monitoring the engine mode control input. At box 102, the controller determines if the engine mode control input is in the economy mode position. If not, the method returns to monitoring the engine mode control input at box 100. If the engine mode control input is in the economy mode position, the method then progresses to determine if the parking brake is on (box 104). If the parking brake is engaged, the controller operates the engine at a fixed idle speed S1 (box 106). If the parking brake is disengaged, the controller operates the engine at a fixed idle speed S2 (box 108) and continues to the next step.

In vehicles having hydraulic steering, an optional next step may be to determine if the steering system has been initiated at box 110. If the steering system has been initiated, the controller may operate the engine at a fixed idle speed S3 (box 112). If the steering system is not on, the engine speed is maintained at fixed idle speed S2 and the method progresses to the next step.

At box 114, the position of the propel control input is determined. If the propel control input remains in the neutral position, the engine speed is maintained at the fixed idle speed S2. If the propel control input is moved from the neutral position to a drive position, the controller will increase the engine speed to a fixed idle speed S4 (box 116). At the same time, the method will also determine the status of the vibratory system (box 118). If the vibratory system is on, the controller will operate the engine at a fixed idle speed S5 (box 120). If the vibratory system is off, the controller will continue to operate the engine at the fixed idle speed S4.

When the engine is operated at the fixed idle speed S4 (i.e., when the propel control input is in a drive position but the vibratory system is off), the method will check to ensure that the fixed idle speed S4 produces sufficient power to propel the vehicle 20 at the command speed indicated by the propel control input. More specifically, at box 122, the method determines if the propel pump is at maximum displacement. This may be accomplished by using feedback from the propel pump displacement sensor. If the propel pump is below maximum displacement, the fixed idle speed S4 provides sufficient power for the current command speed and the process returns to box 116. If the propel pump is at maximum displacement, however, the power provided by the engine at fixed idle speed S4 is insufficient for the current command speed and therefore the controller will increase engine speed to meet the demand (box 124). While the propel pump remains at maximum displacement, the controller will vary engine speed according to the commanded speed provided by the propel control input.

The fixed idle speeds S1-S5 may be selected so that they are lower than the idle speeds used in conventional vehicles but still allow the engine to produce sufficient power for operating the systems of the vehicle as needed under the associated set of control inputs. In an asphalt compactor having hydraulic steering, for example, the fixed idle speeds S1-S5 may be set as follows: S1 may be approximately 800 rpm; S2 may be approximately 1000 rpm; S3 may be approximately 1200 rpm; S4 may be approximately 1400 rpm; and S5 may be approximately 1600-2200 rpm (depending on the size and type of vibratory system employed by the vehicle). When controlling ground speed of the asphalt compactor using variable engine speed, the engine may be operated in a range of approximately 1400-2200 rpm. In a soil compactor (which does not have hydraulic steering), for example, the fixed idle speeds may be set as follows: S1 may be approximately 800 rpm; S2 may be approximately 1000 rpm; S3 is not applicable; S4 may be approximately 1500 rpm, and S5 may be approximately 2000 rpm. When controlling ground speed of the soil compactor using variable engine speed, the engine may be operated in a range of approximately 1500-2000 rpm.

When the method is operating in box 124 to vary engine speed according to command speed, the engine speed control method may be modified to conserve additional fuel during commonly employed applications of the vehicle. More specifically, when the vehicle is reducing ground speed, a corresponding reduction in engine speed is delayed or smoothed to avoid engine speed hunting. This is particularly advantageous when the vehicle is executed propel reversals, where the propel control input is reciprocated back and forth.

Figure 5:
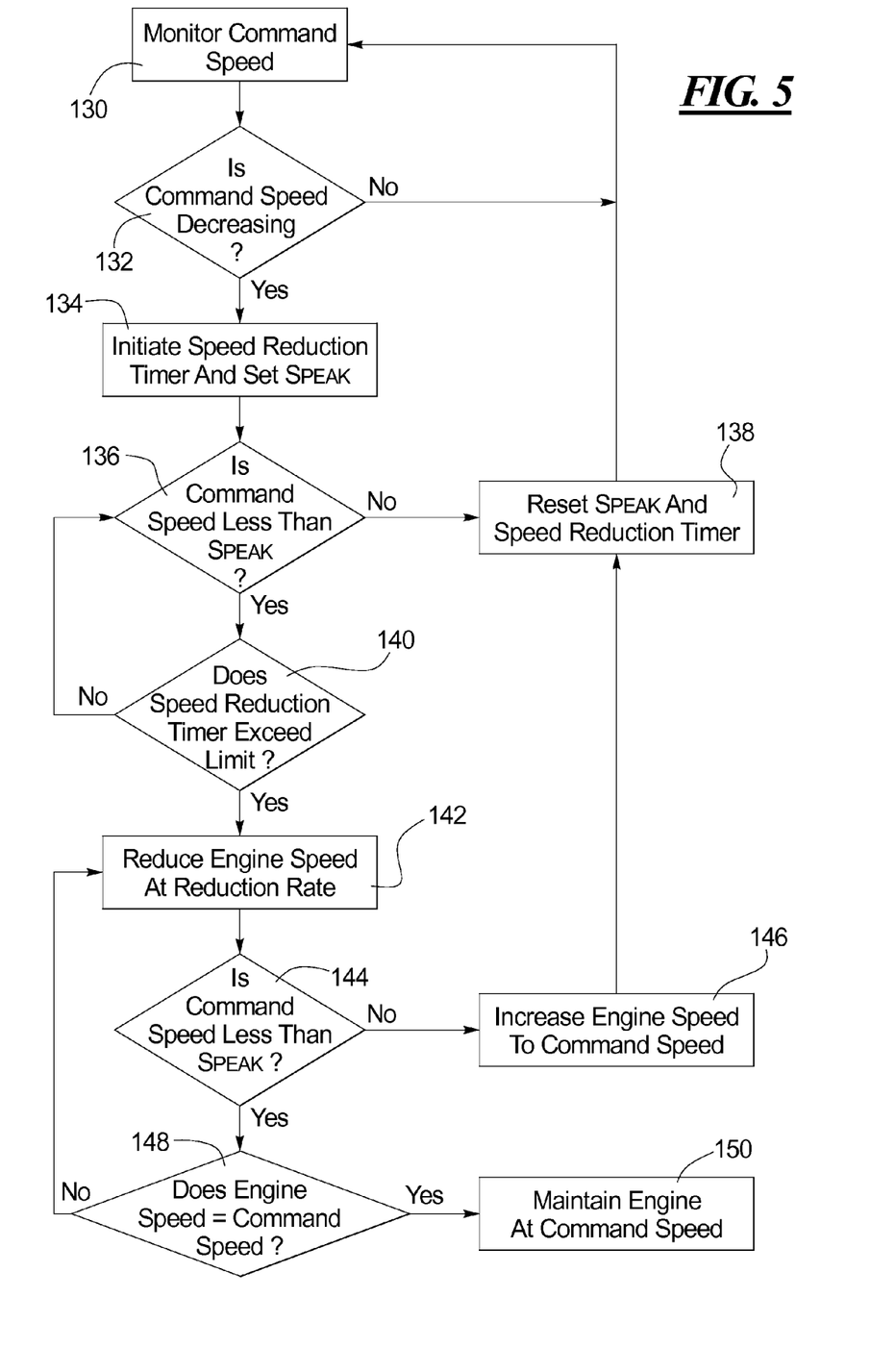
FIG. 5 is a flowchart for a method of operating the engine at variable speeds with a propel pump engaged.

Accordingly, the controller may further be programmed to execute an engine speed smoothing routine illustrated schematically in FIG. 5. The routine begins at box 130 by monitoring the command speed from the propel control input. At box 132, the command speed is monitored to determine if it is decreasing. If not, the process returns to box 130. If command speed is decreasing, a peak speed $S_{PEAK}$ is set and a speed reduction time is initiated at box 134. Next, the command speed is compared to the peak speed $S_{PEAK}$ to ensure that the commanded ground speed is less (box 136). If the command speed has increased back above $S_{PEAK}$, the speed reduction timer and $S_{PEAK}$ are reset at box 138 and the method returns to that start of the routine at box 130.

If the command speed remains less than the peak speed $S_{PEAK}$, the method advances to box 140 where the speed reduction timer is compared to a speed reduction timer limit. The speed reduction timer may be set at any period, such as approximately 30 seconds, that advantageously avoids engine speed hunting while permitting a reduction of engine speed for extended low ground speed periods. If the speed reduction timer does not exceed the timer limit, the process returns to box 136. If the timer limit is exceeded, the controller reduces engine speed at a set reduction rate (box 142). The reduction rate may be set at any value that again balances the need to avoid engine speed hunting while promoting fuel conservation during extended low command speeds. For example, the reduction rate may be set at approximately 5 rpm/second. While the engine speed is being reduced at the speed reduction rate, the method again determines if the current command speed is less than the peak speed $S_{PEAK}$ (box 144). If the current command speed exceeds the peak speed $S_{PEAK}$, the controller increases engine speed to meet the power demand of the command speed (box 146), resets the peak speed $S_{PEAK}$ and speed reduction timer (box 138), and returns to the start box 130. Otherwise, if the current command speed continues to be less than the peak speed $S_{PEAK}$, then the method compares the current engine speed with the current command speed (box 148). If the engine continues to operate at a speed that produces more power than is needed by the current command speed, the method returns to box 142 and the controller continues to decrease engine speed at the reduction rate. If, however, the engine speed produces power that substantially equals the power demand of the current command speed, the controller maintains the engine at that speed (box 150) and the process may return to the start (box 130).

Figure 6:
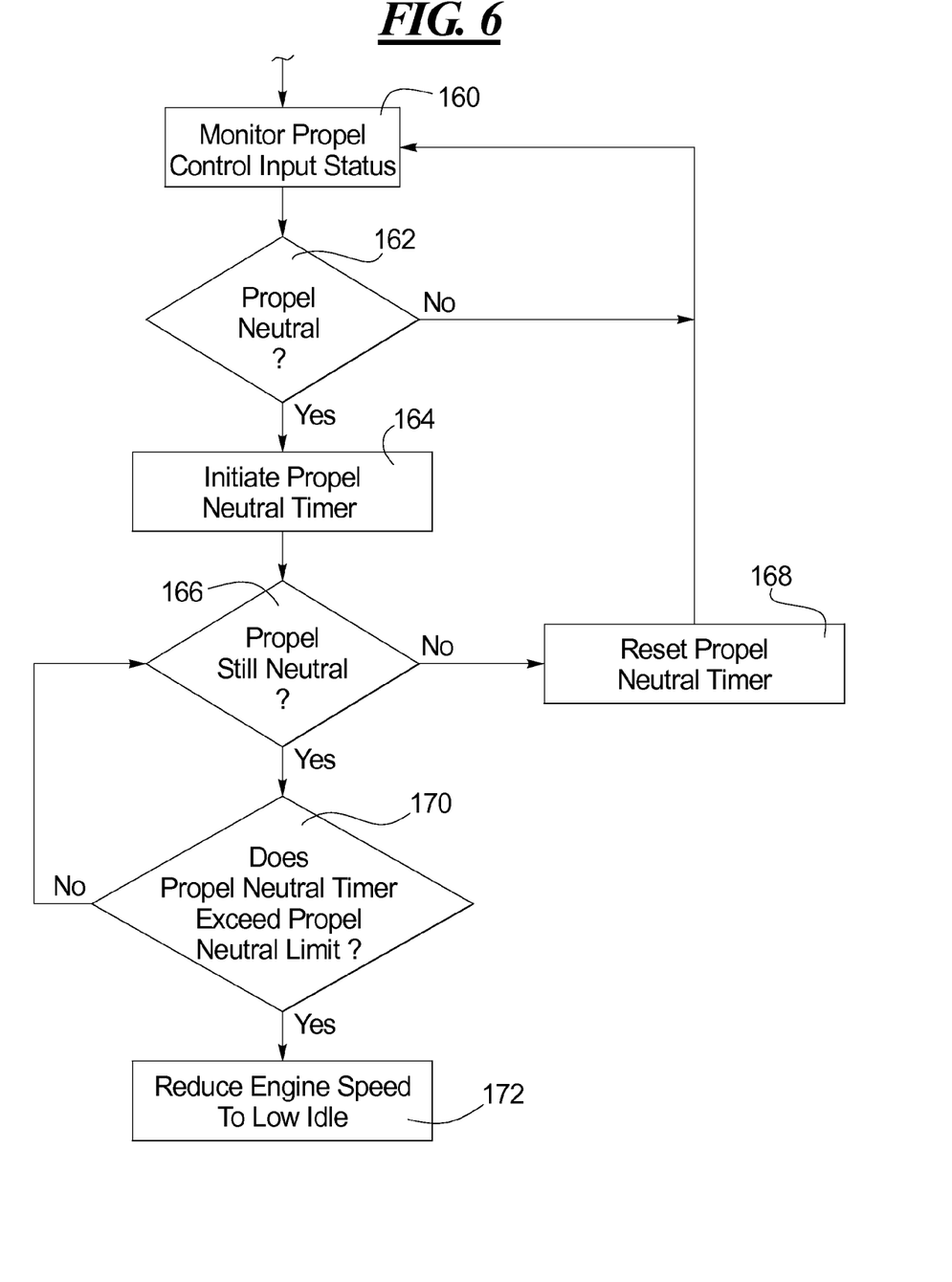
FIG. 6 is a flowchart for a method of automatically switching the engine to low idle in response to neutral dwell.

The controller may further employ a neutral dwell sub-routine in which the engine speed is reduced to a low idle speed in response to the propel control input residing in the neutral position for a predetermined period of time. A flowchart illustrating the neutral dwell sub-routine is illustrated in FIG. 6, and begins at box 160 where the status of the propel control is monitored. At box 162, the controller determines if the propel control is in the neutral position. If the propel control input is not in the neutral position, the process returns to the start (box 160). If the propel control input is determined to be in the neutral position, a propel neutral timer may be initiated (box 164). Next, the controller determines if the propel control input continues to remain in the neutral position (box 166). If the propel control input is no longer in the neutral position, the propel neutral timer is reset (box 168) and the process returns to the start (box 160). Otherwise, the method advances to box 170 where the propel neutral timer is compared to a propel neutral timer limit. If the propel neutral timer is less than the limit, the method returns to box 166. If, however, the propel neutral timer exceeds the timer limit, the controller reduces the engine speed to a low idle (box 172).

The propel neutral timer limit may be set at any advantageous period. In some embodiments, the period may be selected so that it infers an intent to leave the vehicle in the neutral position for an extended period of time, such as, for example, approximately 10 seconds. The low idle speed in response to neutral dwell may be set so that it matches the current status of the control inputs. For example, where the propel control input remains in neutral past the timer limit but the parking brake is not engaged, the controller may operate the engine at the fixed idle speed S2 (box 108 of FIG. 4). It will be appreciated, however, that other neutral dwell low idle speeds may be used.

The controller may be further configured to conserve fuel when in the economy mode based on specific control input scenarios. For example, when in the economy mode, the controller may be arranged to automatically switch the engine speed to a fixed low idle speed any time the parking brake is engaged. The fixed low idle speed may be equal to that used during the startup routine (FIG. 4), in which case the engine would be operated at the fixed idle speed S1 (box 106).

Additionally, the controller may execute an engine idle shutdown in response to certain operating conditions existing for a predetermined shutdown period. These conditions may include one or more of the following: (1) engine coolant temperature exceeding a tunable threshold (such as approximately 70° C.); (2) the system idle status being inactive; (3) the desired engine speed equaling low idle; (4) the actual engine speed being less than low idle plus an tunable speed (such as approximately 25 rpm); (5) the regeneration system being inactive; (6) the diesel particulate filter (DPF) outlet temperature being less than a tunable value (such as approximately 500° C.); (7) the controller not being serviced by a service tool; and (8) the parking switch in the engaged position. The shutdown period may be set at any desired time period, such as approximately 5 minutes. An engine idle shutdown notification may be generated at a desired time, such as approximately 20 seconds prior to the shutdown period expiring, to provide notice to the user of the impending shutdown.

Figure 7:
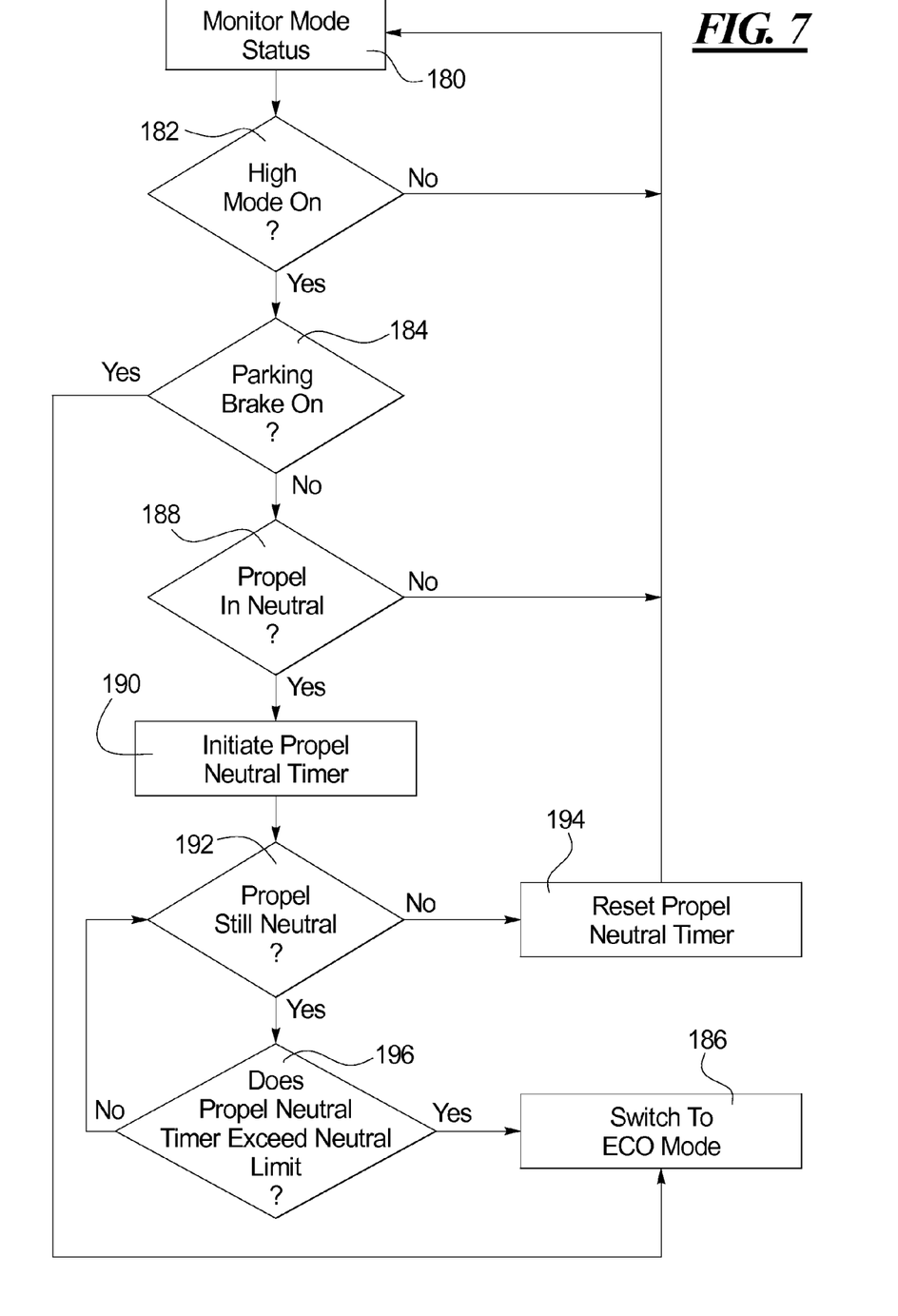
FIG. 7 is a flowchart for a method of automatically switching the engine from high speed mode to economy mode.

The controller may further include a routine for automatically switching to economy mode based on certain control inputs. For example, if the vehicle is in the high speed mode but the user inputs indicate that the current power demand is less than that produced by the fixed high speed idle, the controller may automatically switch from high speed mode to economy mode. A flowchart illustrating this routine is provided at FIG. 7. This routine begins at box 180 by monitoring the status of the engine mode control input. At box 182, the controller checks if the engine mode control input is in the high speed mode. If not, the process returns to the start (box 180). If the engine mode control input is in the high speed mode, then the method proceeds to box 184 where the status of the parking brake is determined. If the parking brake is on, the method jumps directly to box 186 where the controller automatically switches to economy mode, which may include any of the routines or sub-routines discussed above and illustrated in FIGS. 4-6. If the parking brake is off, however, the method progresses to box 188 to determine if the propel control input is in neutral. If the propel control input is not in neutral, the method returns to the start (box 180). Otherwise, a propel neutral timer is initiated at box 190. Next, the controller determines if the propel control input remains in neutral at box 192. If the propel control input is no longer in the neutral position, the propel neutral timer is reset at box 194 and the method returns to the start (box 180). Otherwise, if the propel control input remains in the neutral position, the method progresses to box 196 where the propel neutral timer is compared to a high mode neutral limit. If the propel neutral timer is less than the high mode neutral limit the process returns to box 194 to determine if the propel control input remains in the neutral position. If the high mode neutral timer is exceeded, then the controller automatically switches to economy mode (box 186). The high mode neutral limit may be any advantageous time period. For example, the high mode neutral limit may be selected so that it infers that a lower power demand is needed for an appreciable amount of time. In some embodiments, the high mode neutral limit may be approximately 5 minutes.

INDUSTRIAL APPLICABILITY

The present disclosure is applicable to the efficient operation of hydrostatically operated vehicles or vehicles using pressurized hydraulic fluid for motion and operation of implements associated therewith. One example of such a vehicle is the soil compactor shown in FIG. 1. This vehicle uses pressurized hydraulic fluid to move the vehicle along a base surface, as well as operate a vibratory system integrated within the drum. The soil compactor has an engine generating power that is used to operate the various systems on the vehicle. In accordance with the present disclosure, control of engine operation in an economy mode can advantageously depend on the status of operator control inputs which indicate the power demands of the vehicle, thus allowing for more economical operation.

It will be appreciated that the foregoing description provides examples of the disclosed system and technique. It is contemplated, however, that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

All methods described herein may be performed in any suitable order unless otherwise indicated herein or otherwise clearly contradicted by context. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for controlling operation of an engine in a hydrostatically driven vehicle, the method comprising:
    monitoring an engine mode control input having at least a high mode setting and an economy mode setting;
    monitoring a propel control input associated with a propel pump operably coupled to the engine, the propel control input having a neutral position and a drive position;
    monitoring a propel pump sensor disposed to measure a displacement of the propel pump and generate a propel pump displacement signal, the displacement of the propel pump having a maximum displacement position;
    operating the engine in an economy mode when the engine mode control input is in the economy mode setting, the economy mode including:
        operating the engine at a fixed propel neutral speed when the propel control input is in the neutral position;
        operating the engine at a fixed propel drive speed when the propel control input is in the drive position and the propel pump displacement signal indicates the propel pump displacement is less than the maximum displacement position, the fixed propel drive speed being greater than the fixed propel neutral speed; and
        operating the engine at a variable drive speed when the propel control input is in the drive position and the propel pump displacement signal indicates the maximum displacement position.

2. The method of claim 1, further comprising:
    monitoring an implement control input associated with an implement pump operably coupled to the engine, the implement pump being operably coupled to an implement, the implement control input having a disengaged position and an engaged position;
    wherein the economy mode further includes operating the engine at a fixed implement drive speed when the implement control input is in the engaged position, the fixed implement drive speed being greater than the fixed propel drive speed.

3. The method of claim 2, in which the implement comprises a vibratory system.

4. The method of claim 1, further comprising:
    monitoring a parking brake control input having an engaged position and a disengaged position;
    wherein the economy mode further includes operating the engine at a fixed parking brake speed when the parking brake control input is in the engaged position, the fixed parking brake speed being less than the fixed propel neutral speed.

5. The method of claim 1, further comprising:
    monitoring a steering control input associated with a steering drive, the steering control input having an engaged position and a disengaged position;
    wherein the economy mode further includes operating the engine at a fixed steering initiated speed when the propel control input is in the neutral position and the steering control input is in the engaged position, the fixed steering initiated speed being greater than the fixed propel neutral speed and less than the fixed propel drive speed.

6. The method of claim 1, in which the economy mode further comprises:
    initiating a speed reduction timer and setting a peak command speed in response to a falling propel drive signal; and
    reducing engine speed at a reduction rate when a current propel drive signal remains below the peak command speed and the speed reduction timer exceeds a reduced speed timer limit.

7. The method of claim 6, in which the reduction rate is approximately 5 rpm/second.

8. The method of claim 7, in which the reduced speed timer limit is approximately 30 seconds.

9. The method of claim 1, in which the economy mode further includes:
    initiating a propel neutral timer in response to the propel control input moving from the drive position to the neutral position; and
    reducing engine speed to a low idle speed when the propel control input remains in the neutral position and the propel neutral timer exceeds a propel neutral limit.

10. The method of claim 9, in which the low idle speed is approximately 1000 rpm.

11. The method of claim 9, in which the propel neutral limit is approximately 10 seconds.

12. The method of claim 1, further comprising:
    monitoring a parking brake control input having an engaged position and a disengaged position;
    operating the engine in a high mode when the engine mode control input is in the high mode setting, the high mode including:
        initiating a high mode propel neutral timer when the parking brake control input is in the disengaged position and the propel control input is in the neutral position; and
        automatically switching the engine from the high mode setting to the economy mode setting when the propel control input remains in the neutral position and the high mode propel neutral timer exceeds a high mode propel neutral limit.

13. The method of claim 12, in which the high mode propel neutral limit is approximately 5 minutes.

14. The method of claim 12, in which the high mode further includes automatically switching the engine from the high mode setting to the economy mode setting when the parking brake control input is in the engaged position.

15. A hydrostatically driven vehicle, comprising:
an engine;
an engine mode control input having at least an economy mode setting;
a propel pump operably coupled to the engine, the propel pump having a variable displacement output having a maximum displacement position;
a propel pump sensor disposed to measure the variable displacement output and generate a propel pump displacement signal;
a propel pump actuator operably coupled to the propel pump and configured to adjust the variable displacement output of the propel pump;
a propel control input operably coupled to the propel pump, the propel control input having a neutral position and drive position;
a controller operatively coupled to the engine, the engine mode control input, the propel pump sensor, the propel pump actuator, and the propel control input, the controller being configured to operate in an economy mode in response to the engine mode control input being placed in the economy mode setting, in which the controller:
operates the engine at a fixed propel neutral speed when the propel control input is in the neutral position;
operates the engine at a fixed propel drive speed when the propel control input is in the drive position and the propel pump displacement signal indicates the propel pump displacement is less than the maximum displacement position, the fixed propel drive speed being greater than the fixed propel neutral speed; and
operates the engine at a variable drive speed when the propel control input is in the drive position and the propel pump displacement signal indicates the maximum displacement position.

16. The hydrostatically driven vehicle of claim 15, further comprising:
an implement pump operably coupled to the engine, and
an implement control input operably coupled to the implement pump and having a disengaged position and an engaged position, the implement pump being operably coupled to an implement;
wherein the controller is operably coupled to the implement control input and is further configured to operate the engine at a fixed implement drive speed when the implement control input is in the engaged position, the fixed implement drive speed being greater than the fixed propel drive speed.

17. The hydrostatically driven vehicle of claim 16, in which the implement comprises a vibratory system.

18. The hydrostatically driven vehicle of claim 15, further comprising:
a parking brake; and
a parking brake control input operably coupled to the parking brake and having an engaged position and a disengaged position;
wherein the controller is operably coupled to the parking brake control input and is further configured to operate the engine at a fixed parking brake speed when the parking brake control input is in the engaged position, the fixed parking brake speed being less than the fixed propel neutral speed.

19. The hydrostatically driven vehicle of claim 15, further comprising:
a steering drive; and
a steering control input operably coupled to the steering drive and having an engaged position and a disengaged position;
wherein the controller is operably coupled to the steering control input and is further configured to operate the engine at a fixed steering initiated speed when the propel control input is in the neutral position and the steering control input is in the engaged position, the fixed steering initiated speed being greater than the fixed propel neutral speed and less than the fixed propel drive speed.

20. The hydrostatically driven vehicle of claim 15, in which the controller, when controlling the engine at a variable drive speed, is further configured to:
initiate a speed reduction timer and set a peak command speed in response to a falling propel drive signal; and
reduce engine speed at a reduction rate when a current command speed remains below the peak command speed and the speed reduction timer exceeds a reduced speed timer limit.

21. The hydrostatically driven vehicle of claim 20, in which the reduction rate is approximately 5 rpm/second.

22. The hydrostatically driven vehicle of claim 21, in which the reduced speed timer limit is approximately 30 seconds.

23. The hydrostatically driven vehicle of claim 15, in which the controller is further configured to:
initiate a propel neutral timer in response to the propel control input moving from the drive position to the neutral position; and
reduce engine speed to a low idle speed when the propel control input remains in the neutral position and the propel neutral timer exceeds a propel neutral limit.

24. The hydrostatically driven vehicle of claim 23, in which the low idle speed is approximately 1000 rpm.

25. The hydrostatically driven vehicle of claim 23, in which the propel neutral limit is approximately 10 seconds.

26. The hydrostatically driven vehicle of claim 15, further comprising a parking brake control input operably coupled to the controller and having an engaged position and a disengaged position;
in which the engine mode control input further includes a high mode setting, and in which the controller is further configured to operate with the engine mode control input in the high mode setting by:
initiating a high mode propel neutral timer when the parking brake control input is in the disengaged position and the propel control input is in the neutral position; and
automatically switching the engine from the high mode setting to the economy mode setting when the propel control input remains in the neutral position and the high mode propel neutral timer exceeds a high mode propel neutral limit.

27. The hydrostatically driven vehicle of claim 26, in which the high mode propel neutral limit is approximately 5 minutes.

28. The hydrostatically driven vehicle of claim 26, in which the controller is further configured to operate with the engine mode control input in the high mode setting by automatically switching the engine from the high mode setting to the economy mode setting when the parking brake control input is in the engaged position.

* * * * *